United States Patent
Shrivastava et al.

(10) Patent No.: US 12,353,864 B2
(45) Date of Patent: Jul. 8, 2025

(54) COMMON PLATFORM FOR IMPLEMENTING RPA SERVICES ON CUSTOMER PREMISES

(71) Applicant: UiPath, Inc., New York, NY (US)

(72) Inventors: Shashank Shrivastava, Bangalore (IN); Rajiv Chodisetti, Bangalore (IN); Vlad Stanciu, Bucharest (RO); Raja Charu Vikram Kakumani, Redmond, WA (US); Petre Popescu, Bucharest (RO)

(73) Assignee: UiPath, Inc., New York, NY (US)

( * ) Notice: Subject to any disclaimer, the term of this patent is extended or adjusted under 35 U.S.C. 154(b) by 212 days.

(21) Appl. No.: 17/449,096

(22) Filed: Sep. 28, 2021

(65) Prior Publication Data

US 2023/0032516 A1   Feb. 2, 2023

(30) Foreign Application Priority Data

Jul. 27, 2021   (IN) .............. 202111033732

(51) Int. Cl.
G06F 9/44       (2018.01)
G05B 19/4155    (2006.01)
G06F 8/61       (2018.01)
G06F 9/445      (2018.01)
G06F 9/455      (2018.01)

(52) U.S. Cl.
CPC .......... *G06F 8/61* (2013.01); *G05B 19/4155* (2013.01); *G05B 2219/50391* (2013.01)

(58) Field of Classification Search
CPC ............... G06F 8/61; G05B 19/4155; G05B 2219/50391
See application file for complete search history.

(56) References Cited

U.S. PATENT DOCUMENTS 9,342,357 B2   5/2016   Grueneberg et al.
9,722,868 B2   8/2017   Narasimhan et al.
9,733,918 B2   8/2017   Alger et al.
(Continued)

FOREIGN PATENT DOCUMENTS

CN   111078236 A  *  4/2020
CN   112677151 A  *  4/2021
(Continued)

OTHER PUBLICATIONS

Bernhard Axmann, Robotic Process Automation: An Overview and Comparison to Other Technology in Industry 4.0, 2020, pp. 1-4. https://ieeexplore.ieee.org/stamp/stamp.jsp?tp=&arnumber=9208907 (Year: 2020) (Year: 2020).*
(Continued)

*Primary Examiner* — Mongbao Nguyen
(74) *Attorney, Agent, or Firm* — Chiesa Shahinian & Giantomasi PC

(57) ABSTRACT

Systems and methods for operating an RPA (robotic process automation) services delivery platform for implementing a plurality of RPA services on premises of a customer are provided. An installer for installing a plurality of RPA services on one or more computing systems located on premises of a customer is generating using the RPA services delivery platform. One or more of the plurality of RPA services installed on the one or more computing systems using the installer are maintained using the RPA services delivery platform.

21 Claims, 8 Drawing Sheets

(56) References Cited

U.S. PATENT DOCUMENTS

| | | | |
|---|---|---|---|
| 10,439,873 | B2 | 10/2019 | Szobi et al. |
| 11,086,614 | B1* | 8/2021 | Jain ........................ G06F 16/148 |
| 11,120,299 | B2* | 9/2021 | Haigh ..................... G06N 3/063 |
| 11,301,224 | B1* | 4/2022 | Dabhi ..................... G06F 9/4881 |
| 2004/0060035 | A1 | 3/2004 | Ustaris |
| 2009/0320017 | A1 | 12/2009 | Jackson et al. |
| 2011/0307881 | A1 | 12/2011 | Konersmann et al. |
| 2015/0341445 | A1 | 11/2015 | Nikolov et al. |
| 2019/0129824 | A1 | 5/2019 | Radhakrishnan et al. |
| 2019/0373083 | A1 | 12/2019 | Nucci et al. |
| 2020/0074329 | A1 | 3/2020 | Sturtivant et al. |
| 2020/0134374 | A1* | 4/2020 | Oros ....................... G06F 18/214 |
| 2020/0348960 | A1* | 11/2020 | Krishnamurthy ... G06F 9/45504 |
| 2021/0126840 | A1* | 4/2021 | Venkataramu ...... H04L 41/0806 |
| 2021/0129325 | A1* | 5/2021 | Yu ........................ G05B 19/4155 |
| 2021/0146537 | A1* | 5/2021 | Bannoura ............. G06F 21/604 |
| 2021/0191760 | A1* | 6/2021 | Madkour ............... G06Q 10/10 |
| 2021/0279050 | A1* | 9/2021 | Chen .......................... G06F 8/71 |
| 2022/0121982 | A1* | 4/2022 | Rajagopalan .......... G06N 20/00 |
| 2022/0129257 | A1* | 4/2022 | Touati .................. G06F 16/2315 |
| 2022/0278951 | A1* | 9/2022 | Brevoort ............... G06F 3/0481 |
| 2022/0291666 | A1* | 9/2022 | Cella ......................... B25J 13/00 |
| 2022/0350582 | A1* | 11/2022 | Go .............................. G06F 8/61 |
| 2022/0391310 | A1* | 12/2022 | Ghergu ................... G06F 9/451 |
| 2022/0405064 | A1* | 12/2022 | Silverstein .......... G06F 3/04812 |
| 2023/0230054 | A1* | 7/2023 | Livesay ................ H04L 9/3247 |
| | | | 705/39 |

FOREIGN PATENT DOCUMENTS

| | | | | |
|---|---|---|---|---|
| CN | 112997203 A | * | 6/2021 | ......... G05B 19/0426 |
| CN | 113168335 A | * | 7/2021 | ............... G06F 8/34 |
| EP | 3598355 A1 | * | 1/2020 | ....... G05B 19/41865 |
| EP | 3617961 A1 | * | 3/2020 | ........... G06F 16/903 |
| WO | WO-2020246960 A1 | * | 12/2020 | ........... G05B 19/418 |

OTHER PUBLICATIONS

J. G. Enríquez, Robotic Process Automation: A Scientific and Industrial Systematic Mapping Study, 2020, pp. 1-17. https://ieeexplore.ieee.org/stamp/stamp.jsp?tp=&arnumber=9001110 (Year: 2020).*

Ajay Kattepur, Verification and Timing Analysis of Industry 4.0 Warehouse Automation Workflows, 2018, pp. 1-8. https://ieeexplore.ieee.org/stamp/stamp.jsp?tp=&arnumber=8502587 (Year: 2018).*

Milena Petkova, Administrative Automatic Solutions in Telecom Services, 2020, pp. 1-4. https://ieeexplore.ieee.org/stamp/stamp.jsp?tp=&arnumber=9299554 (Year: 2020).*

English translation, Hall (CN 112997203 A), 2021, pp. 1-20. (Year: 2021).*

English translation, Lin (CN 111078236 A), 2020, pp. 1-10. (Year: 2020).*

Arneson, "Moving from Cloud Development to Deploy on Premises," CenturyLink, retrieved online on Jun. 2, 2021 from https://www.ctl.io/developers/blog/post/ansible-hybrid-cloud-to-on-premise, 9 pgs.

Galpin, "Lessons Learned: Deploying Microservices Software Product in Customer Environments," 2017, MesosCon North America, 24 pgs.

International Search Report and Written Opinion mailed Apr. 25, 2022, in connection with International Patent Application No. PCT/US2021/072868, filed Dec. 13, 2021, 10 pgs.

* cited by examiner

700

```
┌─────────────────────────────────────┐
│ Generating, using the RPA services  │
│   delivery platform, an installer   │
│ for installing a plurality of RPA   │
│ services on one or more computing   │
│ systems located on premises of a    │
│              customer               │
│                 702                 │
└─────────────────────────────────────┘
                  │
                  ▼
┌─────────────────────────────────────┐
│ Maintaining, using the RPA services │
│ delivery platform, one or more of   │
│ the plurality of RPA services       │
│ installed on the one or more        │
│ computing systems using the installer│
│                 704                 │
└─────────────────────────────────────┘
```

FIG. 7

COMMON PLATFORM FOR IMPLEMENTING RPA SERVICES ON CUSTOMER PREMISES

TECHNICAL FIELD

The present invention relates generally to RPA (robotic process automation), and more particularly to an RPA services delivery platform for implementing RPA services on customer premises.

BACKGROUND

RPA (robotic process automation) services, such as, e.g., orchestration, design, and RPA robots, may be provided to customers via the cloud as a SaaS (software as a service) solution. At times, customers may prefer such RPA services to be implemented on-premises to provide for a more unified product experience. Conventionally, RPA services are implemented on-premises via different delivery and maintenance mechanisms. However, the conventional on-premises implementation of RPA services requires a high amount of overhead for the customers.

BRIEF SUMMARY OF THE INVENTION

In accordance with one or more embodiments, systems and methods for operating an RPA (robotic process automation) services delivery platform for implementing a plurality of RPA services on premises of a customer are provided. An installer for installing a plurality of RPA services on one or more computing systems located on premises of a customer is generating using the RPA services delivery platform. One or more of the plurality of RPA services installed on the one or more computing systems using the installer are maintained using the RPA services delivery platform. In one embodiment, the installer is generated by onboarding, building, and testing the plurality of RPA services. The generating may be performed by build time components of the RPA services delivery platform and the maintaining may be performed by runtime components of the RPA services delivery platform.

In one embodiment, the one or more of the plurality of RPA services can run according to a runtime architecture of the RPA services delivery platform. The runtime architecture comprises infra components for running a computing cluster, RPA services delivery platform components for performing operations on the computing cluster for the one or more of the plurality of RPA services, and RPA services comprising the one or more of the plurality of RPA services.

In one embodiment, the plurality of RPA services comprises at least one of an orchestrator for orchestrating execution of RPA workflows, a designer for designing RPA workflows, or RPA robots for executing RPA workflows.

In one embodiment, the one or more computing systems has network connectivity and the one or more of the plurality of RPA services are installed on the one or more computing systems by the installer retrieving data for installing the one or more of the plurality of RPA services from a registry via the network. In another embodiment, the one or more computing systems do not have network connectivity and the one or more of the plurality of RPA services are installed on the one or more computing systems by the installer comprising data for installing the one or more of the plurality of RPA services.

These and other advantages of the invention will be apparent to those of ordinary skill in the art by reference to the following detailed description and the accompanying drawings.

BRIEF DESCRIPTION OF THE DRAWINGS

FIG. 7 shows a method for operating an RPA services delivery platform, in accordance with one or more embodiments.

DETAILED DESCRIPTION

Figure 1:
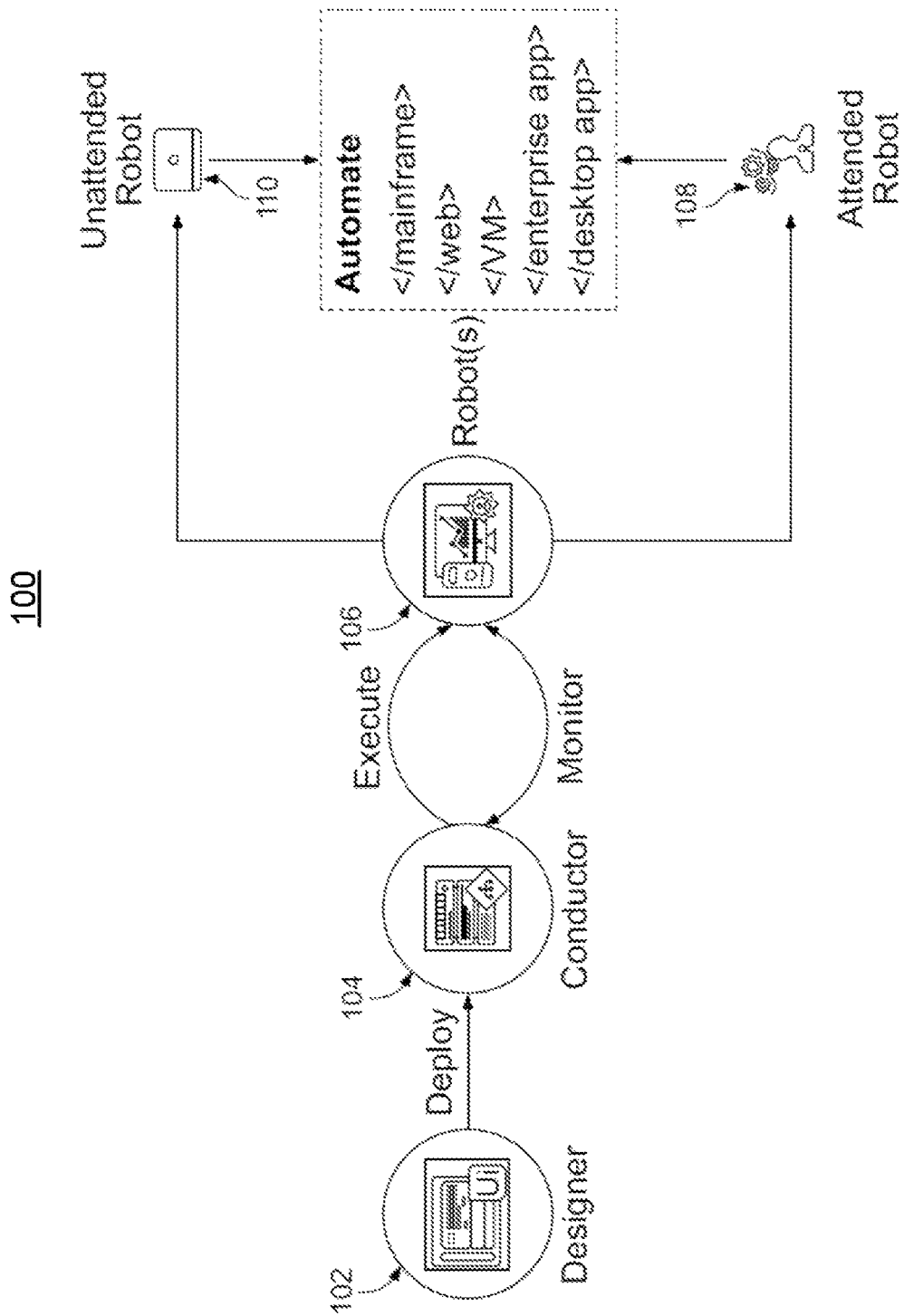
FIG. 1 is an architectural diagram illustrating a robotic process automation (RPA) system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of RPA robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
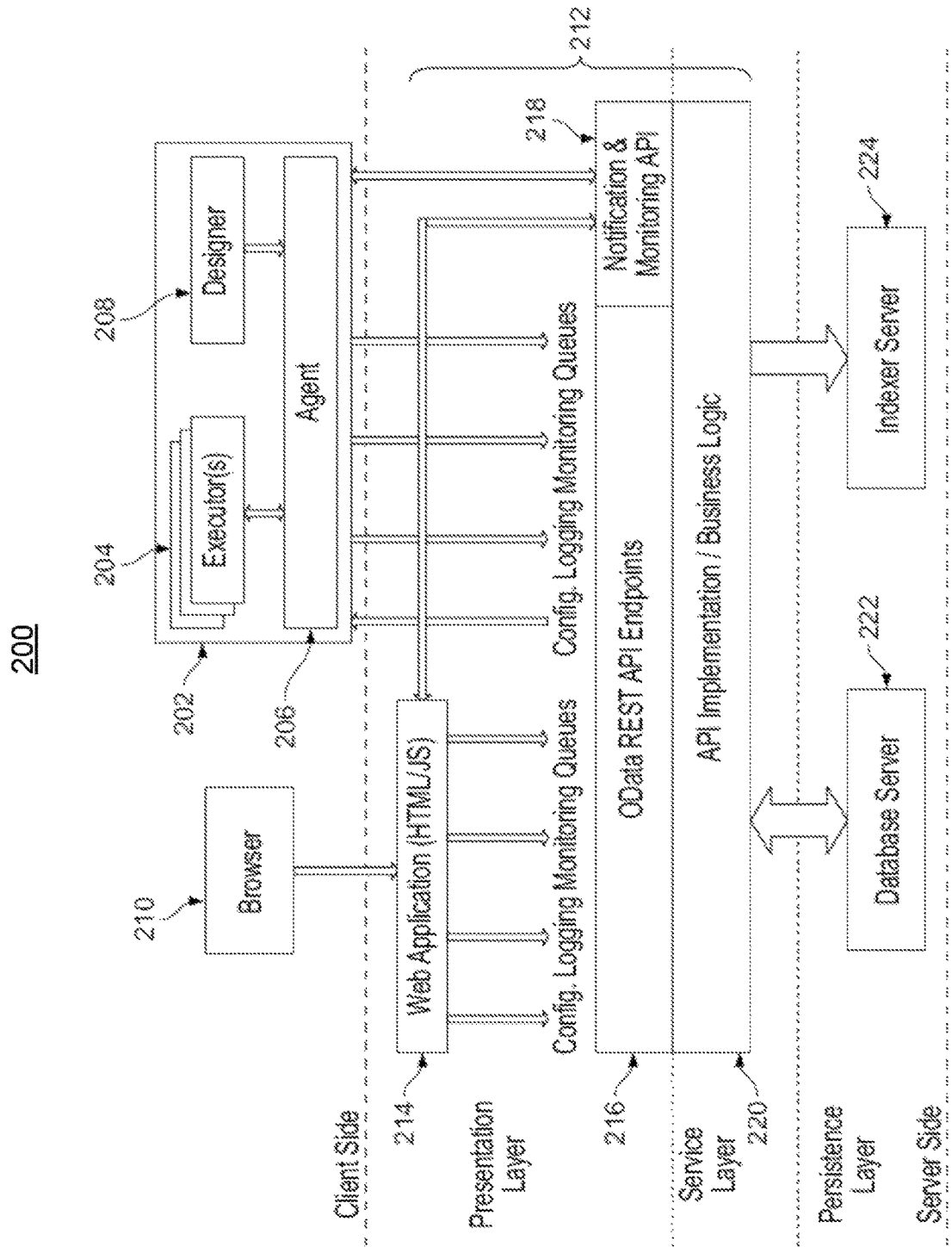
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
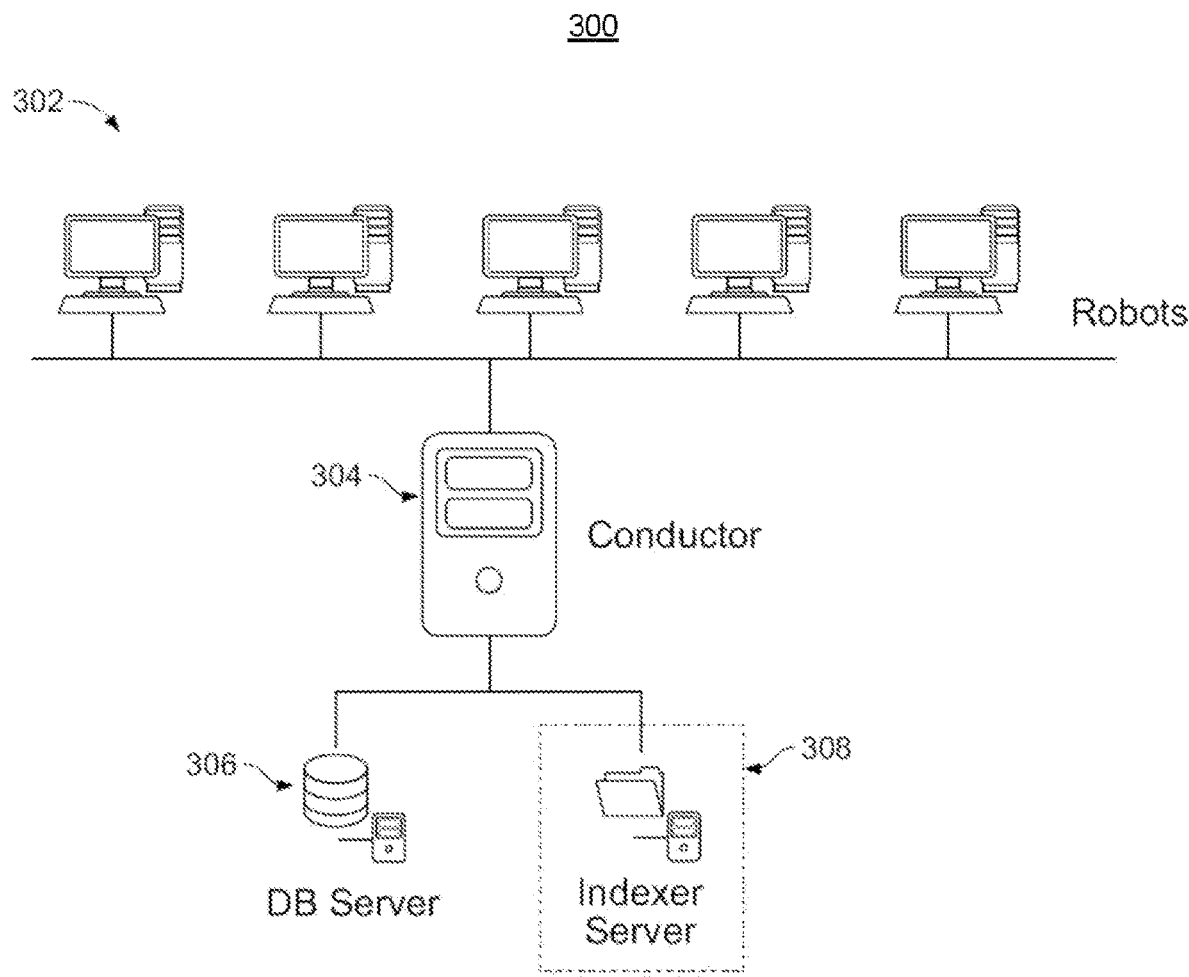
FIG. 3 is an architectural diagram illustrating a simplified deployment example of an RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 100 of FIG. 1, RPA system 200 of FIG. 2, and/or RPA system 300 of FIG. 3 may be implemented for cloud-based management of RPA robots. Such cloud-based management of RPA robots enables RPA to be provided as Software as a Service (SaaS). Accordingly, conductor 104 of FIG. 1, conductor 212 of FIG. 2, and/or conductor 304 of FIG. 3 is implemented in the cloud for cloud-based management of RPA robots to, e.g., create RPA robots, provision RPA robots, schedule tasks on RPA robots, decommission RPA robots, or effectuate any other orchestration task for managing RPA robots.

Figure 4:
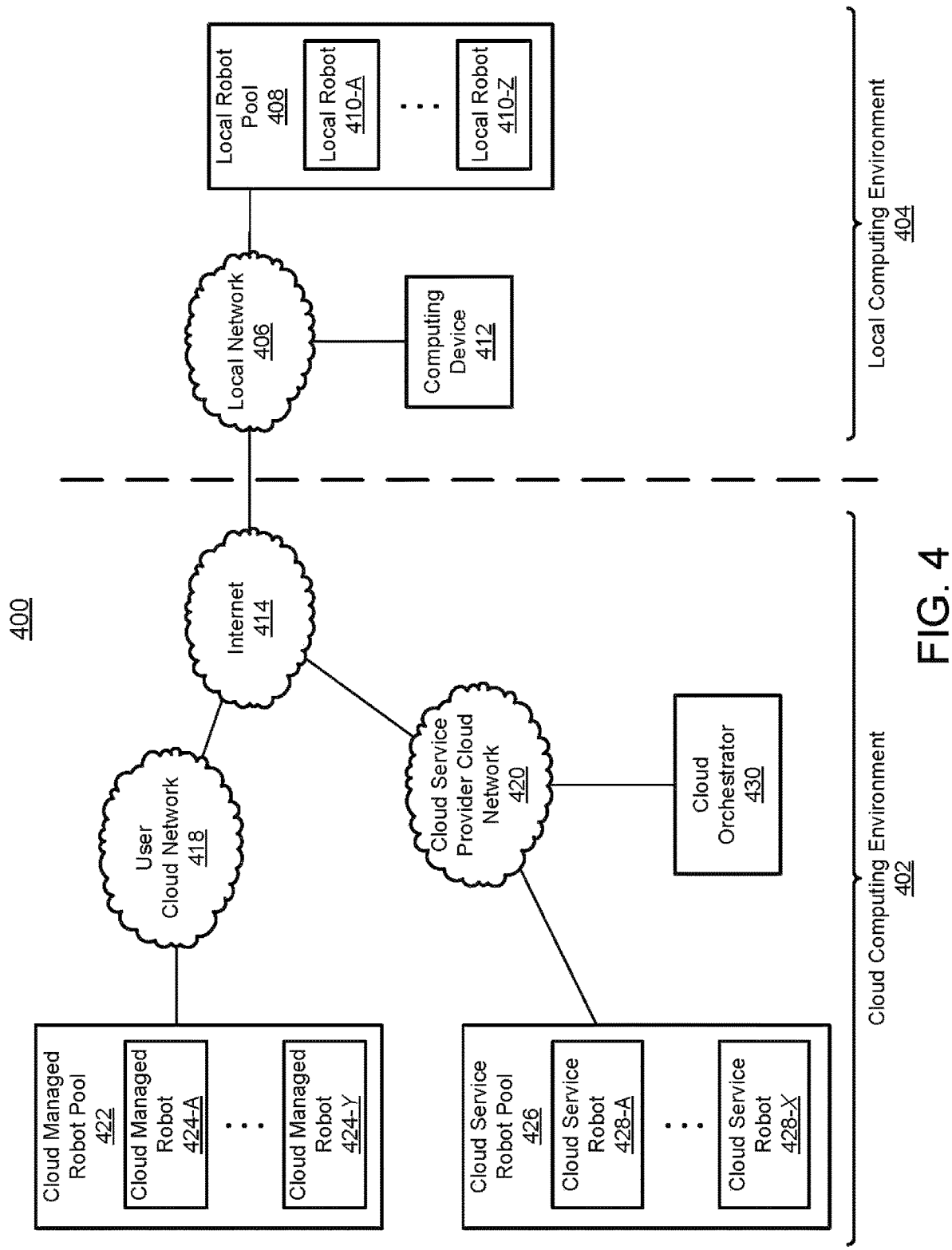
FIG. 4 shows an architecture diagram illustrating a cloud RPA system for implementing cloud-based management of robotic process automation robots, according to an embodiment of the invention.

FIG. 4 illustrates an architectural diagram of a cloud RPA system 400 for implementing cloud-based management of RPA robots, in accordance with one or more embodiments. Cloud RPA system 400 comprises a cloud computing environment 402 and a local computing environment 404. Local computing environment 404 represents a local network architecture of a user or any other entity or entities, such as, e.g., a company, a corporation, etc. Local computing environment 404 comprises local network 406. Cloud computing environment 402 represents a cloud computing network architecture that provides services or processing of workloads remote from the user at local computing environment 404. Cloud computing environment 402 comprises various cloud networks, including internet 414, user cloud network 418 representing a cloud network managed (or controlled) by the user and hosted by a cloud platform provider, and a cloud service provider cloud network 420 representing a cloud network managed by a cloud service provider and hosted by a cloud platform provider. The cloud service provider is an entity that provides services (e.g., RPA) via the cloud. The cloud platform provider is an entity that maintains cloud computing infrastructure. Local network 406 of local computing environment 404 is communicatively coupled to internet 414 of cloud computing environment 402 to facilitate communication between local computing environment 404 and cloud computing environment 402.

As shown in FIG. 4, a cloud orchestrator 430 is implemented in cloud computing environment 402 to enable cloud-based management of RPA robots. In particular, cloud orchestrator 430 is managed by a cloud service provider and hosted in cloud service provider cloud network 420 within cloud computing environment 402. In one embodiment, the cloud service provider provides RPA to the user in local computing environment 404.

Cloud orchestrator 430 manages RPA robots in cloud computing environment 402. In particular, the user interacts with computing device 412 in local computing environment 404 to transmit instructions for managing RPA robots to cloud orchestrator 430 in cloud computing environment 402. Alternatively, the user interacts with computing device 412 in local computing environment 404 to set a schedule on cloud orchestrator 430 to automatically transmit instructions on behalf of the user for managing RPA robots. Exemplary instructions for managing RPA robots include instructions for creating RPA robots, provisioning RPA robots, scheduling a task on RPA robots (e.g., schedule a time for performing the task and a type of robot to perform the task), decommissioning RPA robots, or any other orchestration instructions for RPA robots. In response to receiving the instructions, cloud orchestrator 430 effectuates the instructions by, e.g., creating the RPA robots, provisioning the RPA robots, scheduling the task of the RPA robot, decommissioning the RPA robots, etc. In one embodiment, cloud orchestrator 430 may be similar to conductor 104 of FIG. 1, conductor 212 of FIG. 2, or conductor 304 of FIG. 3, but implemented in cloud service provider cloud network 420 within cloud computing environment 402.

The RPA robots managed by cloud orchestrator 430 may include a pool of cloud robots that are deployed and maintained within cloud computing environment 402. Such cloud robots may include one or more cloud service robots 428-A, . . . , 428-X (hereinafter collectively referred to as cloud service robots 428) of cloud service robot pool 426 and one or more cloud managed robots 424-A, . . . , 424-Y (hereinafter collectively referred to as cloud managed robots 424) of cloud managed robot pool 422. Such cloud robots perform (i.e., process) tasks in cloud computing environment 402 and transmit results of the tasks to the user in local computing environment 404. Additionally or alternatively, the RPA robots managed by cloud orchestrator 430 may include one or more local robots 410-A, . . . , 410-Z (hereinafter collectively referred to as local robots 410) of local robot pool 408.

Cloud service robots 428 are maintained by the cloud service provider in cloud service provider cloud network 420 for performing RPA tasks in cloud computing environment 402 for the user in local network environment 404. Cloud service robots 428 are created upon request by the user sending instructions from computing device 412 to cloud orchestrator 430. Upon creation, cloud service robots 428 enter into a standby mode while waiting to perform a task (or workflow). While in standby mode, the cost for running the cloud service robots 428 is minimized or otherwise reduced. Tasks are scheduled on cloud service robots 428 by the user sending instructions from computing device 412 to cloud orchestrator 430. The instructions for scheduling tasks defines the time for performing the task and a type of robot for performing the task. Cloud service robots 428 wake up from standby mode to perform the task and return to standby mode once the task is complete. Accordingly, cloud service robots 428 perform the tasks on cloud service provider cloud network 420 for the user in local computing environment 404.

Cloud managed robots 424 are maintained by the user in a user cloud network 418 for performing RPA tasks in cloud computing environment 402 for the user in local network environment 404. Cloud managed robots 424 are similar in capability to cloud service robots 428 and are also hosted in cloud computing environment 402. However, user cloud network 418, upon which cloud managed robots 424 are hosted, is managed by the user while cloud service provider cloud network 420, upon which cloud service robots 428 are hosted, is managed by the cloud service provider and hosted by the cloud platform provider. Cloud orchestrator 430 manages cloud managed robots 424 by establishing a connection between cloud service provider cloud network 420 and user cloud network 418. User cloud network 418 may be established by the user utilizing cloud provider technology to tunnel back to local network 406. The user can establish a dedicated network connection from local network 406 to cloud service provider cloud network 420. Connectivity is typically in the form of, e.g., an any-to-any (e.g., internet protocol virtual private network) network, a point-to-point Ethernet network, or a virtual cross-connection through a connectivity provider at a co-location facility. These connections do not go over the public Internet. This offers more reliability, faster speeds, consistent latencies, and higher security than typical connections over the Internet. User cloud network 418 continues to be fully controlled and managed by the user, thereby providing stringent control over data to the user.

Once the connection between cloud service provider cloud network 420 and user cloud network 418 has been established, cloud managed robots 424 are created upon request by the user interacting with cloud orchestrator 430 via computing device 412. Cloud managed robots 424 are created on user cloud network 418. Accordingly, cloud managed robots 424 perform the tasks on user cloud network 418 for the user in local computing environment 404. Algorithms may be applied to maximize the utilization of the robots in cloud managed robot pool 422 and to reduce operating costs for the user.

Local robots 410 are maintained by the user in local network 406 for performing RPA tasks for the user in local network environment 404. Local network 406 is controlled or otherwise managed by the user. Cloud Orchestrator 430 maintains a connection to local robots 410 through standard HTTPS connectivity.

Embodiments described herein provide for a common RPA services delivery platform for implementing a plurality of RPA services on premises of a customer. Exemplary RPA services may include an orchestrator for orchestrating the execution of RPA workflows, a designer for designing RPA workflows, RPA robots for executing RPA workflows, or any other RPA products or services. Such RPA services may be implemented using, for example, RPA system 100 of FIG. 1, RPA system 200 of FIG. 2, RPA system 300 of FIG. 3, and/or cloud RPA system 400 of FIG. 4. The RPA services delivery platform provides for a unified delivery mechanism for the RPA services to provide a consistent user experience for the customer and facilitate troubleshooting and maintenance. The RPA services delivery platform further provides consistency of installation, software version life cycle management (i.e., upgrades) across the RPA services offered as a suite, as well as consistency of managing scale, high availability, and performance limits.

It should be understood that while embodiments described herein provide for an RPA services delivery platform for implementing a plurality of RPA services on premises of a customer, the present invention is not so limited. In accordance with one or more embodiments, a services delivery platform may be provided for implementing any products or services on premises of a customer and is not limited to RPA.

The RPA services delivery platform comprises two components: build time components and runtime components. Build time components are components for generating an installer for installing the plurality of RPA services on one or more computing systems located on premises of a customer. For example, the build time components comprise tools and services for onboarding, building, testing, and generating the installer for the plurality of RPA services. Runtime components are components that are installed on computing systems of the customer for maintaining one or more of the plurality of RPA services installed on the computing systems on premises of the customer. For example, the runtime components comprise tools and services for managing the lifecycle of the infrastructure and the plurality of RPA services. The build time components and runtime components of the RPA services delivery platform are respectively shown in FIG. 5 and FIG. 6, described in detail below.

Figure 5:
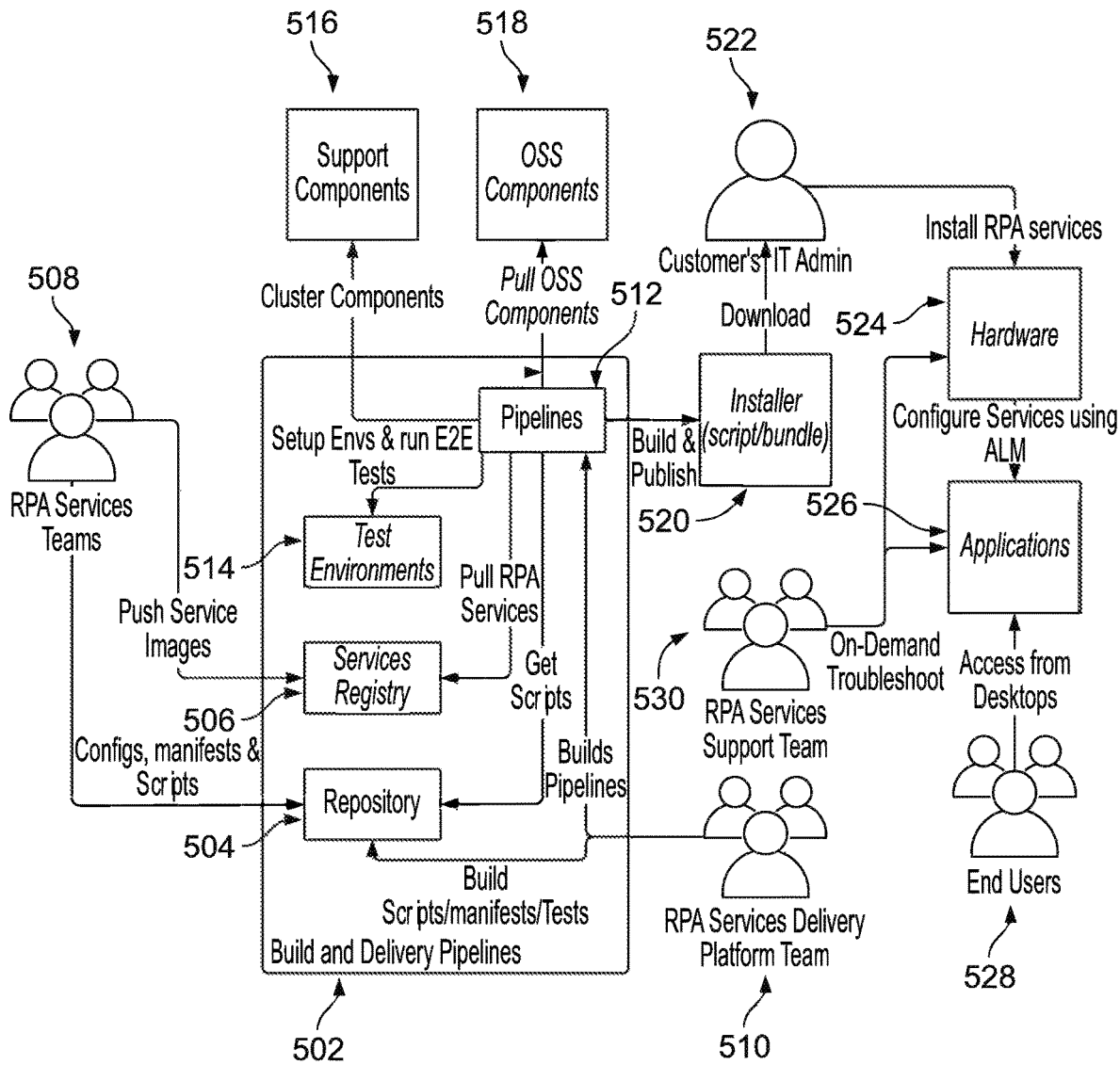
FIG. 5 shows an illustrative systems diagram of build time components of an RPA services delivery platform, in accordance with one or more embodiments.

FIG. 5 shows an illustrative systems diagram 500 of build time components of an RPA services delivery platform, in accordance with one or more embodiments. Build and delivery pipelines 502 comprises one or more repositories 504 and services registry 506. Repositories 504 store configurations, manifests, and scripts received from RPA services teams 508 and/or RPA services delivery platform team 510 for programmatically installing and configuring the build time components and the runtime components of the RPA services delivery platform. Services registry 506 stores tested and containerized images of the plurality of RPA services (and their dependencies) received (e.g., published or pushed) by RPA services teams 508. Pipelines 512 are automated development and operations jobs to validate the configurations, manifests, and scripts stored in repository 504 and facilitate the development, testing, and release of the images of the plurality of RPA services stored in services registry 506 via E2E (end-to-end) testing in test environments 514 using cluster components 516 and OSS (operational support systems) components 518. Pipelines 512 are built by RPA services delivery platform team 510.

Once validated, pipelines 512 build and publish one or more installers 520 for installing scripts and/or a bundle of the plurality of RPA services. Installer 520 enables the customer to install any or all of the plurality of RPA services as per requirements of the customer. In one embodiment, pipelines 512 build a plurality of installers of different types and versions. For example, pipelines 512 may build a first installer for installing the plurality of RPA services on computing systems having internet connectivity and a second installer for installing the plurality of RPA services on air gapped computing systems without internet connectivity. The plurality of RPA services follows a pattern for authentication, discovery, user/tenant/organization management, etc. to enable the plurality of RPA services to be included in the single installer 520. Customer 522 (e.g., the customer's IT admin) downloads installer 520 and installs one or more of the plurality of RPA services, along with other components, on hardware 524 (e.g., one or more computing devices) on premises of the customer using installer 520. The plurality of RPA services is configured using ALM (application lifecycle management) and accessed (e.g., via desktop computers or any other computing device) through applications 526 by end users 528. RPA services support team 530 provides on-demand troubleshooting support for hardware 524 and applications 526.

Figure 6:
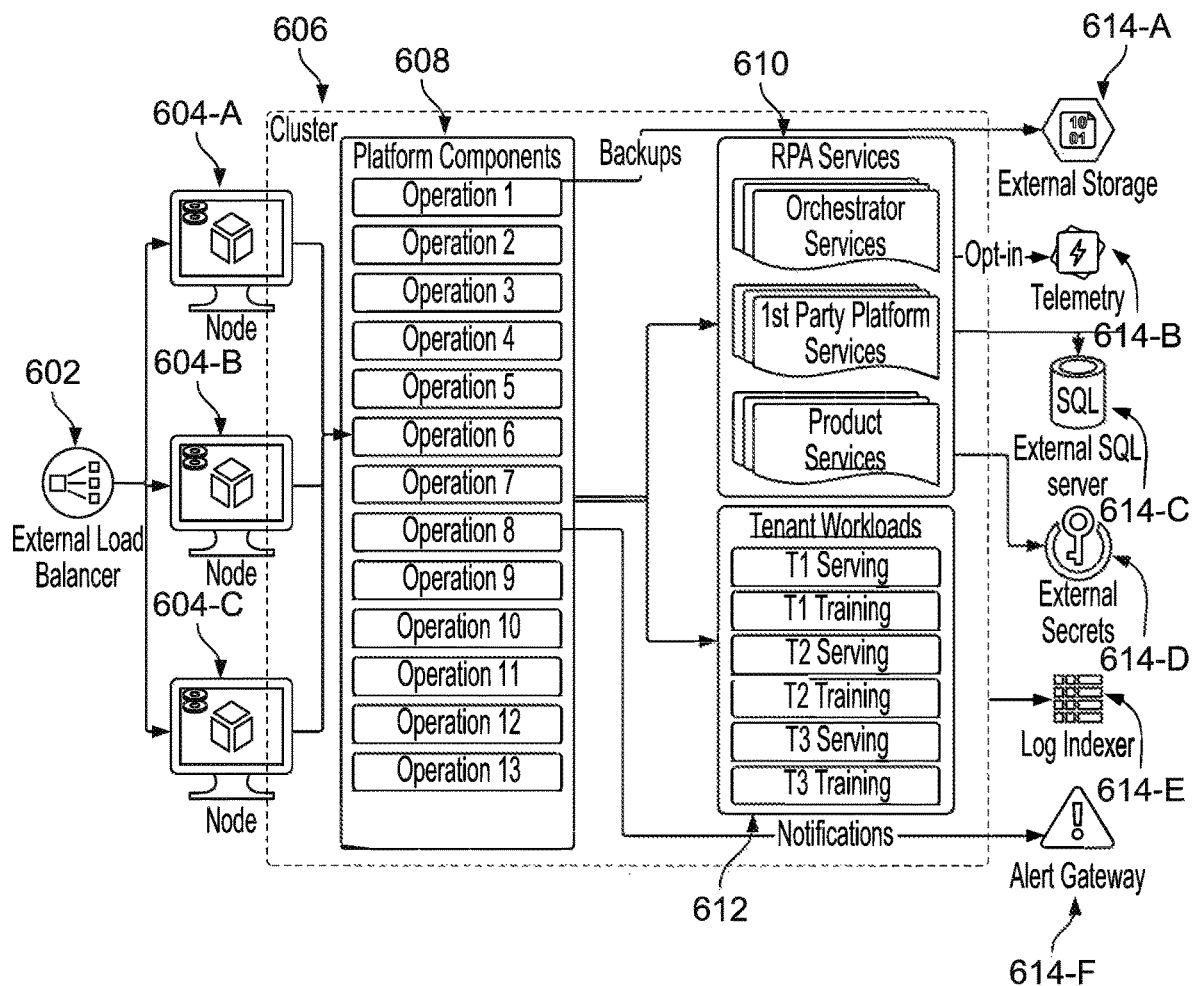
FIG. 6 shows an illustrative systems diagram of runtime components of the RPA services delivery platform, in accordance with one or more embodiments.

FIG. 6 shows an illustrative systems diagram 600 of runtime components of the RPA services delivery platform, in accordance with one or more embodiments. At runtime, the RPA services delivery platform is run on cluster 606 on computing nodes 604-A, 604-B, and 604-C of hardware on premises, where cluster 606 is accessed through external load balancer 602. The runtime architecture comprises three layers: infra components (implemented, for example, as cluster 606), platform components 608, and RPA services 610.

Infra components are software for running cluster 606. The infra components may include, for example, hardware drivers (e.g., operating system drivers, graphics processing unit drivers, etc.), container orchestration platform (e.g., Kubernetes), storage abstraction providers (e.g., Longhorn), etc. The infra components are installed during a first step for implementing the RPA services delivery platform.

Platform components 608 are software running on cluster 606 to provide for performing operations, illustratively shown as operations 1-13, for the installed RPA services. For example, platform components 608 may perform operations such as security, scalability, disaster recovery, resource governance, ALM, monitoring, configuration management, cluster management, message brokering, centralized cache, etc. Platform components 608 are installed during a second step for implementing the RPA services delivery platform after cluster 606 is running.

RPA services 610 are the plurality of RPA services running on cluster 606. For example, as shown in FIG. 6, RPA services 610 may include orchestrator services, first party platform services, and product services. RPA services 610 may run using output of platform components 608. RPA services 610 are installed during a third step for implementing the RPA services delivery platform as defined by the customer. The RPA services delivery platform ensures that all dependencies of the RPA services 610 are installed and ready before the RPA services 610 are installed and configured.

Tenant workloads 612 represent workloads of tenants for running the RPA services 610. For example, as shown in FIG. 6, tenant workloads 612 shows workloads for serving and training machine learning models for tenants T1, T2, and T3.

In some embodiments, additional components or services may be installed by the customer, e.g., to improve stability, security, and maintainability. For example, external load balancer 602 may be installed to balance nodes 604-A, 604-B, and 604-C for running cluster 606, external storage 614-A may be installed to store backups from backup jobs of platform components 608, telemetry 614-B, external SQL (structured query language) server 614-C, and external secrets database 614-D may be installed to store data from RPA services 610, log indexer 614-E may be installed for indexing logs from cluster 606, and alert gateways 614-F may be installed for generating alerts from an alert manager of platform components 608. Other components or services are also contemplated.

FIG. 7 shows a method 700 for implementing a plurality of RPA services on premises of a customer using an RPA services delivery platform, in accordance with one or more embodiments. Method 700 may be performed by any suitable computing device or devices, such as, e.g., computing system 800 of FIG. 8. In one embodiment, the steps of method 700 are performed by an RPA services delivery platform.

At step 702, an installer is generated, using the RPA services delivery platform, for installing a plurality of RPA services on one or more computing systems located on premises of a customer. The plurality of RPA services may include, for example, an orchestrator for orchestrating the execution of RPA workflows, a designer for designing RPA workflows, RPA robots for executing RPA workflows, or any other RPA products or services.

In one embodiment, the installer is generated by onboarding, building, testing, and generating an installer for the plurality of RPA services. The installer is generated by build time components of the RPA services delivery platform. In one example, the build time components may be the build time components shown in FIG. 5.

At step 704, one or more of the plurality of RPA services installed on the one or more computing systems using the installer are maintained using the RPA services delivery platform. The one or more of the RPA services are maintained by runtime components of the RPA services delivery platform. In one example, the run time components may be the runtime components shown in FIG. 6. The one or more RPA services may have been installed by the customer executing the installer bundling the plurality of RPA services. Once installed, the one or more RPA services may be run, upgraded, and/or otherwise maintained by the runtime components.

The one or more RPA services are maintained using infra components, RPA services delivery platform components, and RPA services of the runtime architecture. The infra components run on one or more host computing systems for running a computing cluster on which the RPA services delivery platform components and the RPA services run. The RPA services delivery platform components perform various operations for the RPA services. The RPA services are the one or more installed RPA services.

In one embodiment, in a connected environment where the one or more computing systems has network connectivity (e.g., to the internet), the installer may be transferred to the one or more computing systems via the network and may retrieve data for installing the one or more RPA services from a registry via the network. In another embodiment, in an air-gapped environment where the one or more computing systems does not have network connectivity (e.g., to the internet), the installer may be securely transferred to the one or more computing systems (e.g., via non-network mechanisms) and may comprise data for installing the one or more RPA services.

Figure 8:
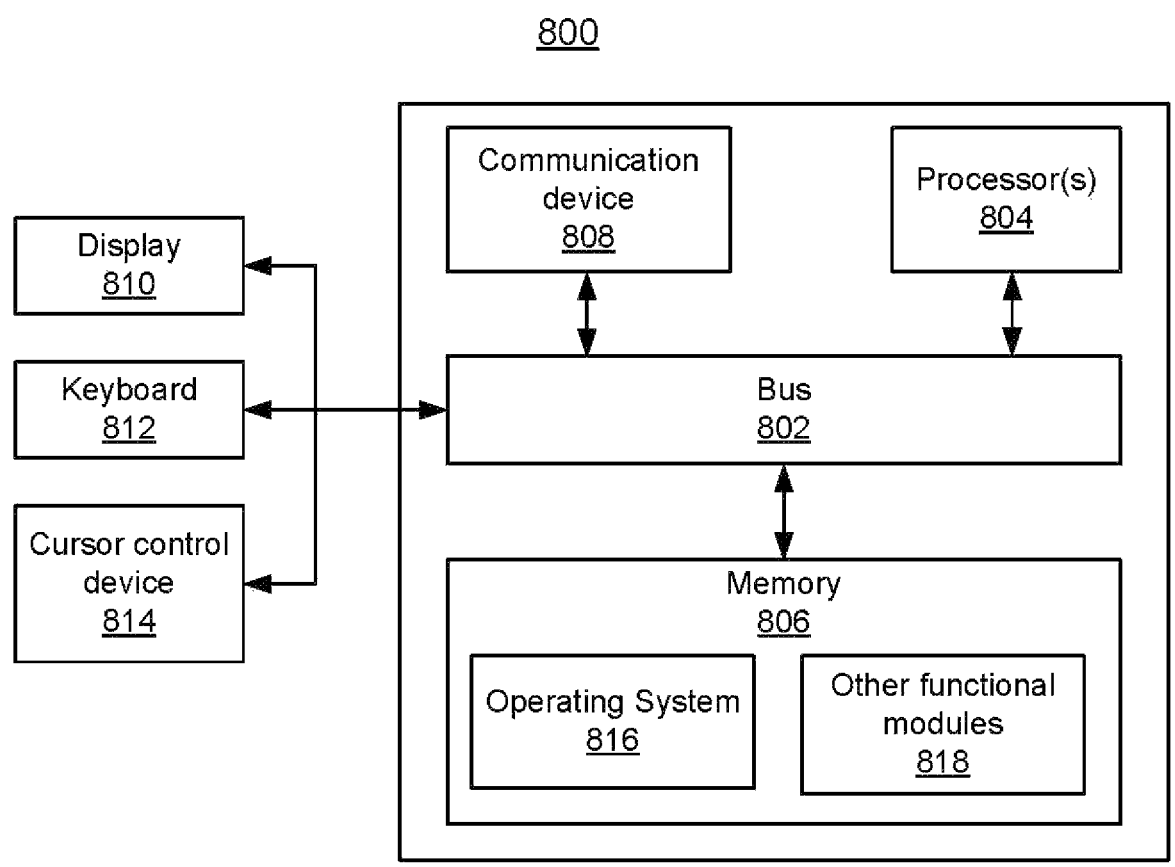
FIG. 8 is a block diagram of a computing system, which may be used to implement embodiments of the invention.

FIG. 8 is a block diagram illustrating a computing system 800. Computing system 800 may be configured to execute the methods, workflows, and processes described herein, including method 700 of FIG. 7, or may be configured to implement systems described herein, including the RPA services delivery platform, according to one or more embodiments of the present invention. In some embodiments, computing system 800 may be one or more of the computing systems depicted and/or described herein. Computing system 800 includes a bus 802 or other communication mechanism for communicating information, and processor(s) 804 coupled to bus 802 for processing information. Processor(s) 804 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 804 may also have multiple processing cores, and at least some of the cores may be configured to perform specific functions. Multi-parallel processing may be used in some embodiments.

Computing system 800 further includes a memory 806 for storing information and instructions to be executed by processor(s) 804. Memory 806 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 804 and may include volatile media, non-volatile media, or both. The media may also be removable, non-removable, or both.

Additionally, computing system 800 includes a communication device 808, such as a transceiver, to provide access to a communications network via a wireless and/or wired connection according to any currently existing or future-implemented communications standard and/or protocol.

Processor(s) 804 are further coupled via bus 802 to a display 810 that is suitable for displaying information to a user. Display 810 may also be configured as a touch display and/or any suitable haptic I/O device.

A keyboard 812 and a cursor control device 814, such as a computer mouse, a touchpad, etc., are further coupled to bus 802 to enable a user to interface with computing system. However, in certain embodiments, a physical keyboard and mouse may not be present, and the user may interact with the device solely through display 810 and/or a touchpad (not shown). Any type and combination of input devices may be used as a matter of design choice. In certain embodiments, no physical input device and/or display is present. For instance, the user may interact with computing system 800 remotely via another computing system in communication therewith, or computing system 800 may operate autonomously.

Memory 806 stores software modules that provide functionality when executed by processor(s) 804. The modules include an operating system 816 for computing system 800 and one or more additional functional modules 818 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for operating an RPA (robotic process automation) services delivery platform, comprising:
    generating, using the RPA services delivery platform, an installer for installing at least one of 1) an orchestrator for orchestrating execution of RPA workflows, 2) a designer for designing RPA workflows, or 3) RPA robots for executing RPA workflows on one or more computing systems located on premises of a customer;
    executing the installer to install one or more of the at least one of the orchestrator, the designer, or the RPA robots on the one or more computing systems; and
    maintaining, using the RPA services delivery platform, the one or more of the at least one of the orchestrator, the designer, or the RPA robots installed on the one or more computing systems using the installer.

2. The computer-implemented method of claim 1, wherein the generating, using the RPA services delivery platform, an installer for installing at least one of 1) an orchestrator for orchestrating execution of RPA workflows, 2) a designer for designing RPA workflows, or 3) RPA robots for executing RPA workflows on one or more computing systems located on premises of a customer comprises:
    onboarding, building, and testing the at least one of the orchestrator, the designer, or the RPA robots.

3. The computer-implemented method of claim 1, wherein the generating is performed by build time components of the RPA services delivery platform and the maintaining is performed by runtime components of the RPA services delivery platform.

4. The computer-implemented method of claim 1, further comprising running the one or more of the at least one of the orchestrator, the designer, or the RPA robots according to a runtime architecture of the RPA services delivery platform, the runtime architecture comprising infra components for running a computing cluster, RPA services delivery platform components for performing operations on the computing cluster for the one or more of the at least one of the orchestrator, the designer, or the RPA robots, and RPA services comprising the one or more of the at least one of the orchestrator, the designer, or the RPA robots.

5. The computer-implemented method of claim 1, wherein the one or more computing systems has network connectivity and the one or more of the at least one of the orchestrator, the designer, or the RPA robots are installed on the one or more computing systems by the installer retrieving data for installing the one or more of the at least one of the orchestrator, the designer, or the RPA robots from a registry via the network.

6. The computer-implemented method of claim 1, wherein the one or more computing systems do not have network connectivity and the one or more of the at least one of the orchestrator, the designer, or the RPA robots are installed on the one or more computing systems by the installer comprising data for installing the one or more of the at least one of the orchestrator, the designer, or the RPA robots.

7. The computer-implemented method of claim 1, wherein the generating, using the RPA services delivery platform, an installer for installing at least one of 1) an orchestrator for orchestrating execution of RPA workflows, 2) a designer for designing RPA workflows, or 3) RPA robots for executing RPA workflows on one or more computing systems located on premises of a customer comprises:
    generating a plurality of installers for installing different types or versions of the at least one of the orchestrator, the designer, or the RPA robots, the plurality of installers comprising the installer.

8. An RPA (robotic process automation) services delivery platform comprising:
    a memory storing computer program instructions; and
    at least one processor configured to execute the computer program instructions, the computer program instructions configured to cause the at least one processor to perform operations comprising:
    generating an installer for installing at least one of 1) an orchestrator for orchestrating execution of RPA workflows, 2) a designer for designing RPA workflows, or 3) RPA robots for executing RPA workflows on one or more computing systems located on premises of a customer;
    executing the installer to install one or more of the at least one of the orchestrator, the designer, or the RPA robots on the one or more computing systems; and
    maintaining, using the RPA services delivery platform, the one or more of the at least one of the orchestrator, the designer, or the RPA robots installed on the one or more computing systems using the installer.

9. The RPA services delivery platform of claim 8, wherein the generating an installer for installing at least one of 1) an orchestrator for orchestrating execution of RPA workflows, 2) a designer for designing RPA workflows, or 3) RPA robots for executing RPA workflows on one or more computing systems located on premises of a customer comprises:
onboarding, building, and testing the at least one of the orchestrator, the designer, or the RPA robots.

10. The RPA services delivery platform of claim 8, wherein the generating is performed by build time components of the RPA services delivery platform and the maintaining is performed by runtime components of the RPA services delivery platform.

11. The RPA services delivery platform of claim 8, the operations further comprising running the one or more of the at least one of the orchestrator, the designer, or the RPA robots according to a runtime architecture of the RPA services delivery platform, the runtime architecture comprising infra components for running a computing cluster, RPA services delivery platform components for performing operations on the computing cluster for the one or more of the at least one of the orchestrator, the designer, or the RPA robots, and RPA services comprising the one or more of the at least one of the orchestrator, the designer, or the RPA robots.

12. The RPA services delivery platform of claim 8, wherein the one or more computing systems has network connectivity and the one or more of the at least one of the orchestrator, the designer, or the RPA robots are installed on the one or more computing systems by the installer retrieving data for installing the one or more of the at least one of the orchestrator, the designer, or the RPA robots from a registry via the network.

13. The RPA services delivery platform of claim 8, wherein the one or more computing systems do not have network connectivity and the one or more of the at least one of the orchestrator, the designer, or the RPA robots are installed on the one or more computing systems by the installer comprising data for installing the one or more of the at least one of the orchestrator, the designer, or the RPA robots.

14. The RPA services delivery platform of claim 8, wherein the generating an installer for installing at least one of 1) an orchestrator for orchestrating execution of RPA workflows, 2) a designer for designing RPA workflows, or 3) RPA robots for executing RPA workflows on one or more computing systems located on premises of a customer comprises:
generating a plurality of installers for installing different types or versions of the at least one of the orchestrator, the designer, or the RPA robots, the plurality of installers comprising the installer.

15. A non-transitory computer-readable medium storing computer program instructions, the computer program instructions, when executed on at least one processor, cause the at least one processor to implement an RPA (robotic process automation) services delivery platform for performing operations comprising:
generating an installer for installing at least one of 1) an orchestrator for orchestrating execution of RPA workflows, 2) a designer for designing RPA workflows, or 3) RPA robots for executing RPA workflows on one or more computing systems located on premises of a customer;
executing the installer to install one or more of the at least one of the orchestrator, the designer, or the RPA robots on the one or more computing systems; and
maintaining, using the RPA services delivery platform, the one or more of the at least one of the orchestrator, the designer, or the RPA robots installed on the one or more computing systems using the installer.

16. The non-transitory computer-readable medium of claim 15, wherein generating an installer for installing at least one of 1) an orchestrator for orchestrating execution of RPA workflows, 2) a designer for designing RPA workflows, or 3) RPA robots for executing RPA workflows on one or more computing systems located on premises of a customer comprises:
onboarding, building, and testing the at least one of the orchestrator, the designer, or the RPA robots.

17. The non-transitory computer-readable medium of claim 15, wherein the generating is performed by build time components of the RPA services delivery platform and the maintaining is performed by runtime components of the RPA services delivery platform.

18. The non-transitory computer-readable medium of claim 15, the operations further comprising running the one or more of the at least one of the orchestrator, the designer, or the RPA robots according to a runtime architecture of the RPA services delivery platform, the runtime architecture comprising infra components for running a computing cluster, RPA services delivery platform components for performing operations on the computing cluster for the one or more of the at least one of the orchestrator, the designer, or the RPA robots, and RPA services comprising the one or more of the at least one of the orchestrator, the designer, or the RPA robots.

19. The non-transitory computer-readable medium of claim 15, wherein the one or more computing systems has network connectivity and the one or more of the at least one of the orchestrator, the designer, or the RPA robots are installed on the one or more computing systems by the installer retrieving data for installing the one or more of the at least one of the orchestrator, the designer, or the RPA robots from a registry via the network.

20. The non-transitory computer-readable medium of claim 15, wherein the one or more computing systems do not have network connectivity and the one or more of the at least one of the orchestrator, the designer, or the RPA robots are installed on the one or more computing systems by the installer comprising data for installing the one or more of the at least one of the orchestrator, the designer, or the RPA robots.

21. The non-transitory computer-readable medium of claim 15, wherein the generating an installer for installing at least one of 1) an orchestrator for orchestrating execution of RPA workflows, 2) a designer for designing RPA workflows, or 3) RPA robots for executing RPA workflows on one or more computing systems located on premises of a customer comprises:
generating a plurality of installers for installing different types or versions of the at least one of the orchestrator, the designer, or the RPA robots, the plurality of installers comprising the installer.

* * * * *